United States Patent
Wei et al.

(10) Patent No.: US 11,589,280 B2
(45) Date of Patent: Feb. 21, 2023

(54) METHOD FOR RETURNING FROM LOW-STANDARD NETWORK TO HIGH-STANDARD NETWORK AND COMMUNICATIONS APPARATUS

(71) Applicant: HUAWEI TECHNOLOGIES CO., LTD., Guangdong (CN)

(72) Inventors: Zhenrong Wei, Beijing (CN); Hao Song, Beijing (CN); Shujun Dang, Shenzhen (CN); Caihua Huang, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 125 days.

(21) Appl. No.: 16/976,679

(22) PCT Filed: Mar. 27, 2018

(86) PCT No.: PCT/CN2018/080626
§ 371 (c)(1),
(2) Date: Aug. 28, 2020

(87) PCT Pub. No.: WO2019/183792
PCT Pub. Date: Oct. 3, 2019

(65) Prior Publication Data
US 2021/0051553 A1    Feb. 18, 2021

(51) Int. Cl.
*H04W 36/14*    (2009.01)
*H04W 8/18*    (2009.01)
*H04W 88/06*    (2009.01)

(52) U.S. Cl.
CPC ........... *H04W 36/14* (2013.01); *H04W 8/186* (2013.01); *H04W 88/06* (2013.01)

(58) Field of Classification Search
CPC ..... H04W 36/14; H04W 8/186; H04W 88/06; H04W 48/16; H04W 48/18; H04W 60/005; H04W 8/183
See application file for complete search history.

(56) References Cited

U.S. PATENT DOCUMENTS 9,450,630 B2 *   9/2016  Cho ...................... H04M 1/724
2011/0059739 A1   3/2011  Huang
(Continued)

FOREIGN PATENT DOCUMENTS

CN    101198136 A    6/2008
CN    103428673 A    12/2013
(Continued)

OTHER PUBLICATIONS

Office Action issued in Japanese Application No. 2020-549547 dated Oct. 25, 2021, 6 pages (with English translation).
(Continued)

*Primary Examiner* — Julio R Perez
(74) *Attorney, Agent, or Firm* — Fish & Richardson P.C.

(57) ABSTRACT

This application provides a method for returning from a low-standard network to a high-standard network, to resolve a problem that a primary card of a terminal device in dual SIM dual standby single pass mode cannot return to the high-standard network after falling back from the high-standard network to the low-standard network during a data service. The method includes: detecting that a first subscriber identification module SIM card of the terminal device falls back from a first-standard network to a second-standard network; obtaining a registration status of a second SIM card, where the registration status includes an operator of the second SIM card and a network on which the second SIM card camps, and the first SIM card and the second SIM card enable the terminal device to work in the dual SIM dual standby single pass mode; obtaining a target standard net-
(Continued)

work based on the registration status of the second SIM card; and registering the first SIM card with the target standard network.

18 Claims, 4 Drawing Sheets

(56) References Cited

U.S. PATENT DOCUMENTS

| | | | |
|---|---|---|---|
| 2013/0156081 | A1 | 6/2013 | Tat et al. |
| 2015/0264640 | A1 | 9/2015 | Feng et al. |
| 2016/0234876 | A1 | 8/2016 | Burra et al. |
| 2017/0006530 | A1 | 1/2017 | Shi et al. |
| 2018/0124868 | A1* | 5/2018 | Gupta ............... H04W 52/0245 |
| 2021/0051553 | A1* | 2/2021 | Wei ........................ H04W 48/16 |
| 2021/0337505 | A1* | 10/2021 | Krishnamoorthy ... H04W 68/02 |
| 2021/0337590 | A1* | 10/2021 | Krishnamoorthy ..... H04W 8/18 |
| 2021/0400699 | A1* | 12/2021 | Nory ................. H04W 72/1289 |

FOREIGN PATENT DOCUMENTS

| | | | |
|---|---|---|---|
| CN | 105392166 A | 3/2016 | |
| CN | 105898805 A | 8/2016 | |
| CN | 106413013 A | 2/2017 | |
| CN | 106455010 A | 2/2017 | |
| JP | 2015216574 A | 12/2015 | |
| WO | WO-2012080377 A1 * | 6/2012 | ............ H04W 68/00 |
| WO | WO-2015131456 A1 * | 9/2015 | ........... H04B 1/0064 |
| WO | 2017101383 A1 | 6/2017 | |

OTHER PUBLICATIONS

Office Action issued in Chinese Application No. 201880090998.5 dated Apr. 2, 2021, 8 pages.
Office Action issued in Indian Application No. 202017035731 dated Nov. 17, 2021, 7 pages.
PCT International Search Report and Written Opinion issued in International Application No. PCT/CN2018/080626 dated Jan. 7, 2019, 12 pages (partial English translation).

* cited by examiner

METHOD FOR RETURNING FROM LOW-STANDARD NETWORK TO HIGH-STANDARD NETWORK AND COMMUNICATIONS APPARATUS

CROSS-REFERENCE TO RELATED APPLICATION

This application is a national stage of International Application of No. PCT/CN2018/080626 filed on Mar. 27, 2018, the disclosure of which is hereby incorporated by reference in its entirety.

TECHNICAL FIELD

This application relates to the communications field, and in particular, to a method for returning from a low-standard network to a high-standard network and a communications apparatus.

BACKGROUND

As a high-standard network, a long term evolution, (LTE) network has been widely deployed. Whether a terminal device can be registered with the LTE network has become an important indicator for a user to evaluate a communication capability of the terminal device. However, in some application scenarios, after falling back from a high-standard network to a low-standard network (for example, a 2G network or a 3G network), the terminal device cannot return to the high-standard network. This severely affects user experience.

SUMMARY

This application provides a method for returning from a low-standard network to a high-standard network. In the method, when a terminal device falls back from a high-standard network to a low-standard network, the terminal device can return to a high-standard network.

According to a first aspect, this application provides a communication method. The method includes: detecting that a first subscriber identification module SIM card of a terminal device falls back from a first-standard network to a second-standard network; obtaining a registration status of a second SIM card, where the registration status includes an operator of the second SIM card and a network on which the second SIM card camps, and the first SIM card and the second SIM card enable the terminal device to work in dual SIM dual standby single pass mode; obtaining a target standard network based on the registration status of the second SIM card; and registering the first SIM card with the target standard network.

With reference to the first aspect, in some implementations of the first aspect, a modem corresponding to the first SIM card is in data service connected mode.

With reference to the first aspect, in some implementations of the first aspect, the first-standard network includes a 4G network, a 4.5G network, or a 5G network, and the second-standard network includes a 2G network or a 3G network.

With reference to the first aspect, in some implementations of the first aspect, the obtaining a target standard network based on the registration status of the second SIM card includes: if the operator of the second SIM card is the same as an operator of the first SIM card, and the second SIM card camps on a high-standard network, using the high-standard network on which the second SIM card camps as the target standard network.

With reference to the first aspect, in some implementations of the first aspect, the obtaining a target standard network based on the registration status of the second SIM card includes: if the operator of the second SIM card is different from the operator of the first SIM card, or the second SIM card camps on a low-standard network, sending a search notification to the second SIM card, where the search notification is used to instruct the second SIM card to search for the target standard network; and obtaining the target standard network from the second SIM card, where the target standard network is found by a modem corresponding to the second SIM card by using a downlink radio frequency resource.

With reference to the first aspect, in some implementations of the first aspect, the registration status of the second SIM card includes whether the second SIM card is installed on the terminal device, and the obtaining a target standard network based on the registration status of the second SIM card includes: if it is determined that the second SIM card is not installed on the terminal device, instructing the modem corresponding to the second SIM card to search for the target standard network; and obtaining the target standard network from the modem corresponding to the second SIM card.

According to a second aspect, this application provides a method for returning from a low-standard network to a high-standard network. The method is applied to a terminal device including a first SIM card and a second SIM card. The first SIM card and the second SIM card enable the terminal device to work in dual SIM dual standby single pass working mode. A primary card is connected to a first-standard network. If the primary card falls back from the first-standard network standard to a second-standard network in a process of processing a data service (for example, a voice or video service), and the data service of the primary card is not stopped after the primary card falls back to the second-standard network, a modem corresponding to the primary card is always in data connected mode. In this case, the primary card cannot use a background search mechanism having a relatively low priority to search for the high-standard network for the primary card again. Consequently, the primary card cannot return to the high-standard network. The background search mechanism is a manner in which a SIM card searches for a standard cell by using a downlink discontinuous reception discontinuous reception (DRX) slot in a process of camping on a serving cell. However, the terminal device in the dual SIM dual standby single pass working mode can support only one SIM card in performing the data service at a same moment, and the other SIM card may receive downlink information and/or data, for example, cell search, paging message reception, and service measurement, without affecting the SIM card that performs the data service. Therefore, after the terminal device detects that the primary card falls back from the first-standard network to the second-standard network, if the data service of the primary card continues, the terminal device obtains the registration status of the second SIM card. The registration status of the second SIM card includes information such as the operator to which the second SIM card belongs and the network on which the second SIM card camps. If the terminal device determines that the first SIM card and the second SIM card belong to a same operator, and a secondary card camps on a high-standard network, the terminal device directly registers the first SIM card with the high-standard network on which the second SIM card camps, so that the primary card can return to the high-standard network. If the terminal device finds that the first SIM card and the second SIM card belong to different operators, or the first SIM card and the second SIM card belong to the same operator, but the second SIM card camps on a low-standard network, the terminal device instructs the second SIM card to search for the target standard network, in other words, instructs the second SIM card to search for a specific high-standard network. After finding the target standard network, the terminal device registers the first SIM card with the target standard network, so that the first SIM card can return to the high-standard network.

Herein, the first-standard network includes a 4G network, a 4.5G network, a 5G network, and a high-standard network that may appear in a future communications system. The second-standard network may include a low-standard network such as a 2G network or a 3G network.

According to a third aspect, this application provides a communications apparatus. The apparatus has a function of implementing the method according to the first aspect and any possible implementation of the first aspect. The function may be implemented by software, or may be implemented by hardware, or may be implemented by a combination of the hardware and the software. The hardware or the software includes one or more units corresponding to the foregoing function.

According to a fourth aspect, this application provides a chip. The chip includes: a detection unit, configured to detect that whether a first subscriber identification module SIM card of a terminal device falls back from a first-standard network to a second-standard network; an obtaining unit, configured to obtain a registration status of a second SIM card when the detection unit detects that the first SIM card falls back from the first-standard network to the second-standard network, where the registration status includes an operator of the second SIM card and a network on the second SIM card camps, the first SIM card and the second SIM card enable the terminal device to work in dual SIM dual standby single pass mode, and the obtaining unit is further configured to obtain a target standard network based on the registration status of the second SIM card; and an registration unit, configured to register the first SIM card with the target standard network.

With reference to the fourth aspect, in some implementations of the fourth aspect, a modem corresponding to the first SIM card is in data service connected mode.

With reference to the fourth aspect, in some implementations of the fourth aspect, if the operator of the second SIM card is the same as an operator of the first SIM card, and the second SIM card camps on a high-standard network, the obtaining unit is specifically configured to use the high-standard network on which the second SIM card camps as the target standard network.

With reference to the fourth aspect, in some implementations of the fourth aspect, the chip further includes a transceiver unit. If the operator of the second SIM card is different from the operator of the first SIM card, or the second SIM card camps on a low-standard network, the transceiver unit is configured to send a search notification to the second SIM card, where the search notification is used to instruct the second SIM card to search for the target standard network; and the obtaining unit is specifically configured to obtain the target standard network from the second SIM card. The target standard network is found by a modem corresponding to the second SIM card by using a downlink radio frequency resource.

The transceiver unit herein may be a communications interface.

With reference to the fourth aspect, in some implementations of the fourth aspect, the registration status of the second SIM card further includes whether the second SIM card is installed on the terminal device, and the obtaining unit is specifically configured to: if it is determined that the second SIM card is not installed on the terminal device, instruct the modem corresponding to the second SIM card to search for the target standard network by using the downlink radio frequency resource.

With reference to the fourth aspect, in some implementations of the fourth aspect, the first-standard network includes 4G, 4.5G, and 5G, and the second-standard network includes a 2G network or a 3G network.

According to a fifth aspect, this application provides a chip (or a chip system). The chip includes a memory and a processor. The memory is configured to store a computer program, and the processor is configured to invoke the computer program from the memory and run the computer program, so that the chip is enabled to perform the method according to the first aspect and any possible implementation of the first aspect.

According to a sixth aspect, this application provides a computer program product. The computer program product includes computer program code. When the computer program code runs on a computer, the computer is enabled to perform the method according to the first aspect and any possible implementation of the first aspect.

According to a seventh aspect, an embodiment of this application provides a terminal device. The terminal device includes a memory and a processor. The memory is configured to store a computer program instruction, and the processor is configured to invoke the computer program instruction from the memory and run the computer program instruction, so that the terminal device is enabled to perform the method according to the first aspect and any possible implementation of the first aspect.

In the technical solution of this application, when the primary card on the terminal device falls back from the first-standard network to the second-standard network, the target standard network may be determined based on a registration status of the secondary card, and the primary card is registered with the target standard network. When the target standard network is the high-standard network, the primary card may be returned to the high standard network.

DESCRIPTION OF EMBODIMENTS

The following describes the technical solutions of this application with reference to the accompanying drawings.

First, related concepts in the embodiments of this application are briefly explained.

Dual SIM dual standby single pass: Two subscriber identification module (SIM) cards installed on a terminal device are continuously switched to ensure that both the two SIM cards are connected to a network in standby mode. However, at a same moment, only one SIM card can perform a data service, and the other SIM card may receive a downlink message including services such as cell search, paging reception, and cell measurement.

Background search is a manner defined in a 3rd generation partnership project (3GPP) to search for a high-priority public land mobile network (PLMN), and specifically refers to that the terminal device searches for another standard cell when normally camping on a serving cell. The background search has a relatively low priority, and does not preempt a downlink timeslot of main working mode (for example, a data service) of the terminal device. Therefore, the background search is mainly applied to some scenarios with low real-time performance. In addition, because the background search has a relatively low priority, in many scenarios, the background search is continuously interrupted or delayed by radio resource control (RRC) connected mode of the terminal device.

In addition, in the embodiments of this application, a high-priority network standard is relative to a low-priority network standard. For example, the low-priority network standard may include 2G and 3G. The high-priority network standard may include 4G, 4.5G, and future 5G.

The technical solutions of this application are applicable to terminal devices working in dual SIM dual standby single pass mode, and are applicable to a case in which two SIM cards are installed on a terminal device or only one SIM card is installed on the terminal device. In other words, the solutions are applicable to a terminal device in dual SIM dual standby single pass working mode regardless of a single-card user or a dual-card user.

These terminal devices include but are not limited to a mobile phone, a tablet personal computer, a media player, a smart television, a laptop computer, an ultra-mobile personal computer (UMPC), a netbook, a personal digital assistant (PDA), a personal computer, a mobile internet apparatus (MID), or a wearable device such as a smartwatch. This is not limited in this application.

The technical solutions provided in this application may be applied to a plurality of scenarios. For example, a primary card of the terminal device keeps performing a data service in a 2G or 3G network and cannot return to 4G. For another example, some 2G or 3G networks are not configured with a 4G reselection parameter, or a configured 4G network reselection parameter is inappropriate. Consequently, the terminal device cannot return to the 4G network after entering idle mode.

The following describes in detail a communication method in the embodiments of this application.

Figure 1:
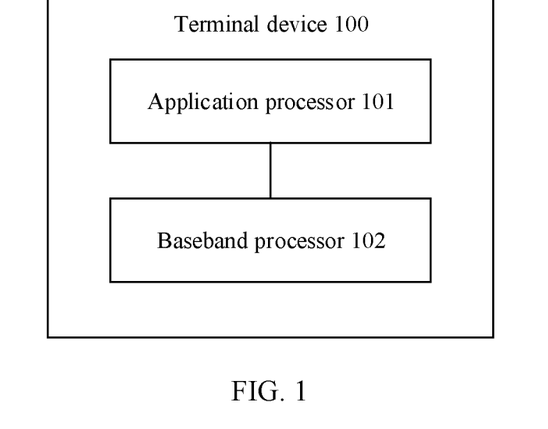
FIG. 1 is a schematic diagram of a design concept according to an embodiment of this application.

FIG. 1 is a schematic diagram of a terminal device 100 applicable to an embodiment of this application. Refer to FIG. 1. The terminal device 100 includes an application processor (AP) 101 and a baseband processor (BP) 102.

The application processor is generally responsible for processing data inside a terminal device, and may run a software program, an operating system, and the like. In this embodiment of this application, for a process of interaction between the application processor 101 and the baseband processor 102, refer to FIG. 2.

Figure 2:
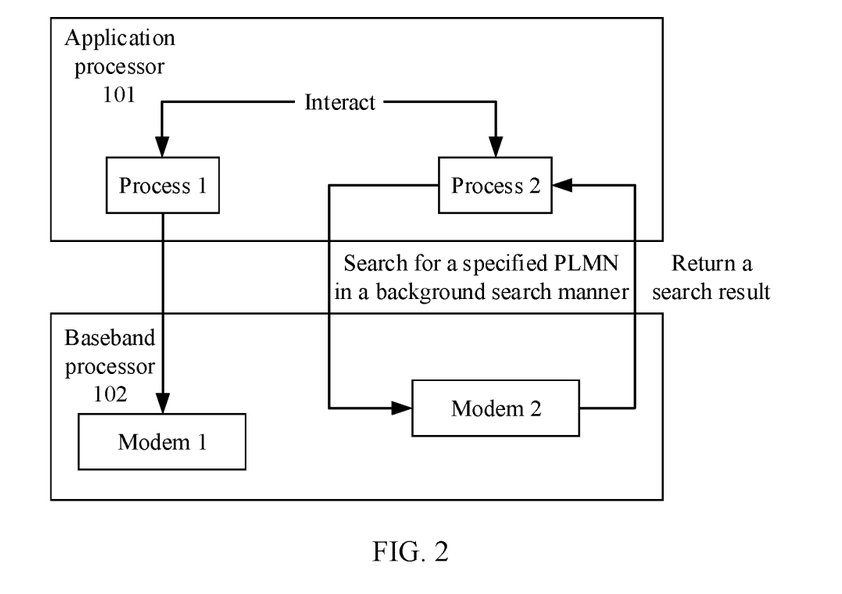
FIG. 2 is a schematic diagram of interaction between an application processor and a baseband processor according to an embodiment of this application.

FIG. 2 is a schematic diagram of interaction between an application processor and a baseband processor according to an embodiment of this application. As shown in FIG. 2, a process 1 and a process 2 run on the application processor 101. The process 1 corresponds to a primary card, and the process 2 corresponds to a secondary card. The baseband processor 102 has a modem 1 and a modem 2. The modem 1 corresponds to the primary card, and the modem 2 corresponds to the secondary card. In this embodiment of this application, after the primary card falls back from a high-standard network to a low-standard network, a process of returning to the high-standard network is as follows: If the process 1 detects in a running process that the primary card falls back from the high-standard network, and the modem 1 corresponding to the primary card is always in data connected mode, the process 1 interacts with the process 2 to notify the process 2 that the primary card falls back from the high-standard network and instructs the process 2 to prepare to search for a specified high-standard network. Further, the process 2 instructs the modem 2 corresponding to the secondary card to search, in a background search manner, for the high-standard network specified by the primary card, and returns a search result to the process 2, and then the process 2 returns the search result to the process 1. The process 1 further instructs the modem 1 to register the primary card with the high-standard network, so that the primary card returns from the low-standard network to the high-standard network. (Detailed description is provided below.)

It should be noted that FIG. 1 and FIG. 2 are described by using an example in which the application processor and the baseband processor are physically independent. In another possible implementation, the application processor 101 may be integrated with the baseband processor to form a system on chip (SoC). In this case, both the process 1 and the process 2 run on the SoC, and the SoC further has the modem 1 and the modem 2.

The modem 1 and the modem 2 shown in FIG. 2 may be physical modems (namely, modems), or may be two modem modules that are of a modem protocol stack and that share one physical modem.

The following describes in detail the communication method in the embodiments of this application by using an example in which the application processor and the baseband processor are integrated. Therefore, the following method embodiments may be considered to be executed by a baseband processor integrated with the application processor.

Figure 3:
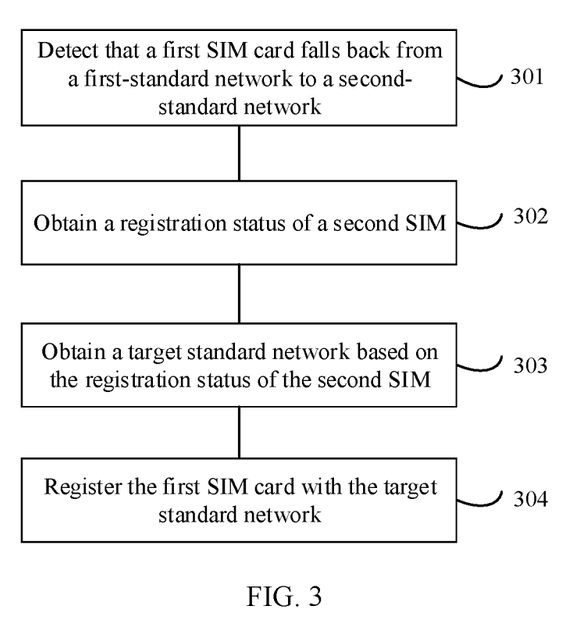
FIG. 3 is a schematic flowchart of a communication method 300 according to an embodiment of this application.

FIG. 3 is a schematic flowchart of a communication method according to an embodiment of this application.

301. Detect that a first SIM card falls back from a first-standard network to a second-standard network.

Generally, the first-standard network is a high-standard network, and the second-standard network is a low-standard network. The high-standard network may also be referred to as a high-priority standard network, and the low-standard network may also be referred to as a low-priority standard network. The high-standard network may include a 4G network, a 4.5G network, a 5G network, and a to-be-emerged higher-standard network. The low-standard network may include a 2G network, a 3G network, and the like.

302. Obtain a registration status of a second SIM.

In this embodiment of this application, a registration status of a SIM card includes an operator of the SIM card, a network standard in which the SIM card camps, and whether the SIM card is installed on a terminal device.

303. Obtain a target standard network based on the registration status of the second SIM.

It should be noted that the target standard network herein refers to a high-standard network that a primary card expects to return to after falling back from the first-standard network to the low-standard network. Therefore, compared with the second-standard network, the target standard network should be at least a high-standard network. For example, if the primary card falls back from a China Mobile 4G network to a China Mobile 2G network, and the primary card expects to return to the China Mobile 4G network, the China Mobile 4G network is the target standard network described in this embodiment of this application.

It may be understood that, in step 303, the registration status of the second SIM includes a plurality of cases. The following describes various cases of the registration status of the second SIM one by one.

Case 1

The second SIM card is installed on the terminal device.

If it is determined that the second SIM card is installed on the terminal device, an operator with which the second SIM card is registered and a network on which the second SIM camps further need to be obtained.

If the operator of the second SIM card is the same as an operator of the first SIM card, and the second SIM card camps on a high-standard network, the high-standard network on which the second SIM card camps is used as the target standard network.

If the operator of the second SIM card is different from the operator of the first SIM card, or the second SIM card camps on a low-standard network, a modem (referred to as a second modem below) corresponding to the second SIM card is instructed to search for the target standard network.

Case 2

The second SIM card is not installed on the terminal device.

If it is determined that the second SIM card is not installed on the terminal device, the second modem is instructed to search for the target standard network.

It should be noted that, in step 203, the second modem searches for the target standard network in a background search manner.

304. Register the first SIM card with the target standard network.

After step 303 in which the target standard network is found, the first SIM is registered with the target standard network.

Specifically, a modem (referred to as a first modem below) corresponding to the first SIM card may be instructed to register the first SIM card with the target standard network.

The foregoing describes in detail the communication method in the embodiments of this application. It can be learned that according to the technical solutions in the embodiments of this application, when the primary card of the terminal device falls back from the high-standard network to the low-standard network, the background search may be performed by using a downlink radio frequency resource of a secondary card, to assist the primary card in returning to the high-standard network.

Figure 4:
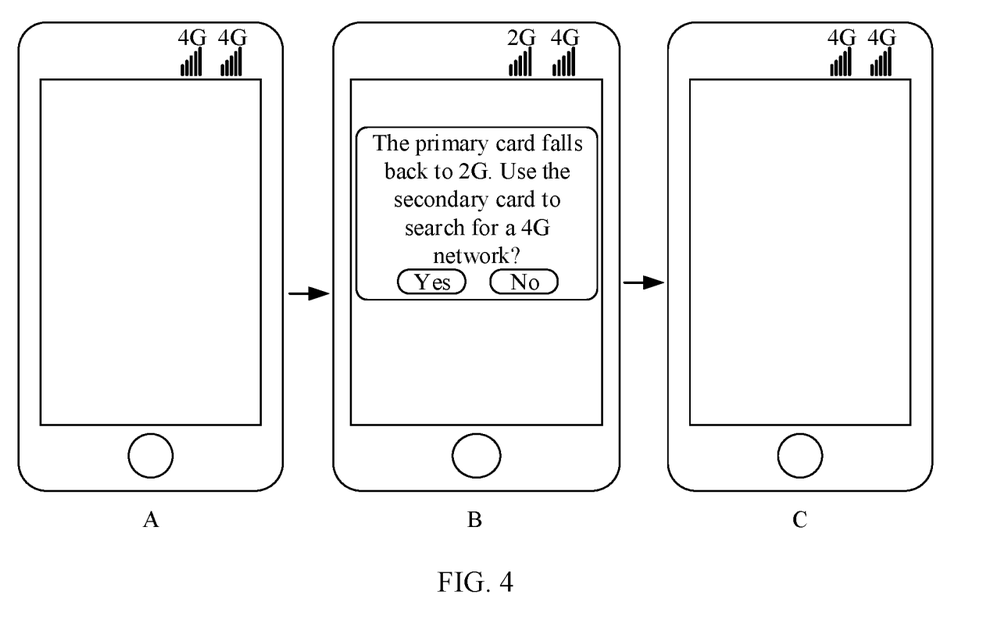
FIG. 4 is an application scenario applicable to an embodiment of this application.

FIG. 4 is an application scenario applicable to an embodiment of this application. As shown in FIG. 4, a status bar on a top of a touchscreen of a terminal device (for example, a mobile phone) displays network standards connected to a primary card and a secondary card. It is assumed that the first icon in the status bar from left to right is a network standard connected to the primary card, and the second icon in the status bar is a network standard connected to the secondary card. In a scenario shown in A of FIG. 4, both the primary card and the secondary card are connected to a 4G network, and the primary card is processing a data service. For example, a user is using the primary card to make a voice call or watch a video. It is assumed that when the user moves to a location with relatively weak signal strength (for example, enters an elevator or moves to an area without 4G network coverage), the primary card may fall back from the 4G network to a 2G network, as a scenario shown in B of FIG. 4. In this case, the terminal device may prompt, by automatically displaying a window, the user that the primary card falls back to the 2G network, and allow the user to choose whether to use the secondary card to search for a 4G network. If the user chooses "Yes", the secondary card searches for the 4G network, and returns a search result to the primary card after finding the 4G network, so that the primary card returns to the 4G network again, as shown in C of FIG. 4.

It should be understood that the application scenarios in FIG. 4 are merely examples, and a plurality of specific implementations may further be included. For example, the terminal device may be configured as follows: When the primary card falls back from 4G to 2G, the secondary card automatically searches for the 4G network without prompting the user. In this way, the primary card may return to the 4G network without being perceived by the user. For another example, after the primary card returns to the high-standard network, prompt information may be pushed to the user, to prompt the user that the primary card has returned to the high-standard network.

In addition, in the application scenarios shown in FIG. 4, the primary card and the secondary card may belong to different operators, or may belong to a same operator. The technical solutions in this application are applicable to both cases. For example, the primary card belongs to China Mobile, and the secondary card belongs to China Unicom. Alternatively, both the primary card and the secondary card belong to China Mobile or China Unicom.

In addition, the secondary card shown in FIG. 4 is connected to the 4G network. In some application scenarios, the secondary card may also be connected to a low-standard network such as a 2G network or a 3G network. This is not limited in this application.

The foregoing describes, with reference to FIG. 3 and FIG. 4, the communication method in the embodiments of this application from a perspective of a chip. The following further describes in detail the communication method in the embodiments of this application with reference to FIG. 5.

Figure 5:
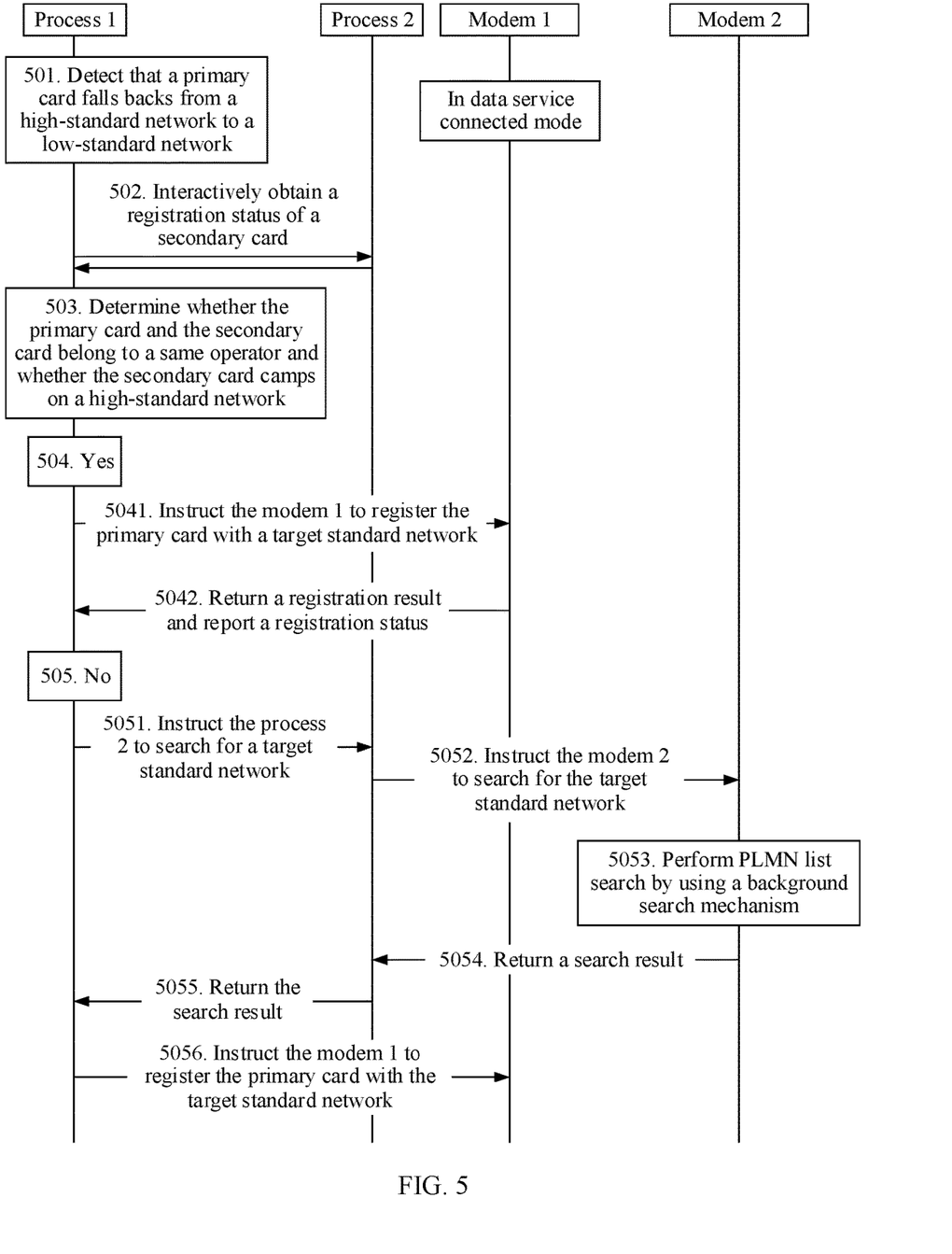
FIG. 5 is another schematic flowchart of a communication method according to an embodiment of this application.

FIG. 5 is another schematic flowchart of a communication method according to an embodiment of this application.

501. A process 1 detects that a primary card falls back from a high-standard network to a low-standard network.

For example, the primary card falls back from an LTE network (namely, a 4G network) to a 2G network or a 3G network.

It should be noted that, when the primary card falls back from the high-standard network, because the primary card is always performing a data service, a modem (denoted as a modem 1 below) corresponding to the primary card is still in data service connected mode.

It should be noted that, as described above, the process 1 and a process 2 run on an AP, and the AP and a BP may be separately disposed, or the AP may be integrated into the BP. Therefore, that the process 1 detects that the primary card falls back from the high-standard network herein may be that an entity performing the process 1 detects that the primary card falls back from the high-standard network. The entity performing the process 1 may be the AP or the BP. Similarly, procedures and/or operations performed by the process 1 and the process 2 described below are actually performed by entities (for example, the BP) that perform the process 1 and the process 2. If the AP and the BP are separately disposed, interaction between the process 1 and the process 2 is interaction between the entity performing the process 1 and an entity performing the process 2.

502. The process 1 interacts with the process 2, and the process 1 obtains a registration status of a secondary card.

For descriptions of the registration status of the secondary card, refer to the foregoing descriptions. Details are not described herein again.

503. The process 1 determines whether the primary card and the secondary card belong to a same operator, and determines whether the secondary card camps on a high-standard network.

In step 503, if a result of the determining is "yes", a procedure of step 504 is performed. If a result of the determining is "no", a procedure of step 505 is performed.

504. The primary card and the secondary card belong to the same operator, and the secondary card camps on a high-standard network.

In this case, step 5041 and step 5042 are performed between the process 1 and the modem 1, to enable the primary card to return to the high-standard network.

5041. The process 1 directly instructs the modem 1 to register the primary card with the high-standard network on which the secondary card camps.

To be specific, in this case, the network on which the secondary card camps is used as a target standard network.

5042. The modem 1 completes registration of the primary card with the high-standard network, and returns a registration result to the process 1, to report a registration status of the primary card.

505. The primary card and the secondary card do not belong to the same operator, or the secondary card camps on a low-standard network.

In this case, steps 5051 to 5056 are performed to enable the primary card to return to the high-standard network.

5051. The process 1 instructs the process 2 to prepare to search for the target standard network.

For example, the primary card belongs to China Mobile; the secondary card belongs to China Unicom; and the secondary card camps on a 4G network. In this case, the process 1 may instruct the process 2 to search for a China Mobile 4G network.

5052. The process 2 instructs a modem corresponding to the secondary card to search for the target standard network.

Herein, the modem corresponding to the secondary card is denoted as a modem 2.

5053. The modem 2 searches for a PLMN list by using a background search mechanism.

The background search mechanism has been described above. Specifically, in this embodiment of this application, when normally camping on a serving cell, the secondary card searches for another standard cell by using a discontinuous reception (DRX) slot. In this specification, the modem 2 uses the background search mechanism to search for another standard network nearby, to find a high-standard network that the primary card can be registered with.

5054. The modem 2 returns a search result to the process 2.

5055. The process 2 returns the search result to the process 1.

In steps 5054 to 5055, the process 2 may return a found target standard network to the process 1. Alternatively, the PLMN list may be returned, and the process 1 selects, from the PLMN list, a target standard network that meets a condition.

5056. The process 1 instructs the modem 1 to register the primary card with the target standard network.

Subsequently, the modem 1 registers the primary card with the target standard network, and returns the registration result to the process 1, to report the registration status of the primary card.

Through the foregoing procedures, the primary card can return from the low-standard network to the high-standard network.

According to the communication method in this embodiment of this application, after the primary card of a terminal device falls back from the high-standard network to the low-standard network, the secondary card searches for the high-standard network by using a downlink radio frequency resource and by using the background search mechanism, and feeds back the high-standard network to the primary card, so that the primary card is re-registered with the high-standard network. This resolves a problem that when performing the data service, the primary card cannot return to the high-standard network after falling back from the high-standard network to the low-standard network.

It should be noted that in the procedures shown in FIG. 5, both the primary card and the secondary card are installed on the terminal device. This is the dual-card user scenario mentioned above. This embodiment of this application is also applicable to a single-card user. Specifically, similar to FIG. 5, in step 502, the process 1 interacts with the process 2, and the process 1 obtains the registration status of the secondary card. In this case, it may be learned whether the secondary card is installed on the terminal device, or in other words, it may be learned whether the secondary card is in an "in-position" state. If it is determined that the secondary card is not installed on the terminal device, the process 1 may directly instruct the process 2 to search for the target network standard. Subsequent procedures are similar to those shown in FIG. 5, and details are not described herein again.

Actually, most users disconnect from the high-standard network (for example, the LTE network) in a short time. Based on an actual test verification result, a terminal device that does not use the solutions cannot return to the high-standard network all the time. However, by using the technical solutions of this application, after falling back from the high-standard network, the terminal device may return to the high-standard network in 30 seconds to 60 seconds.

In addition, for a terminal device that is in data service connected mode and that cannot return to the 4G network after falling to the 2G/3G network, in the prior art, the 4G network can be restored only by turning off a data service, turning on or off a "4G switch", or turning on or off "airplane mode", and user experience is extremely poor. By using the technical solutions in this application, the terminal device can obtain a 4G network coverage status in advance, so that the terminal device can quickly register with the 4G network without being perceived by a user, thereby enhancing user experience.

In addition, for a user performing a data service for a short time or in a scenario in which a network does not cooperate with an inter-RAT, by using the technical solutions in this application, the terminal device can quickly return to the high-standard network.

The foregoing describes in detail the communication method in the embodiments of this application. The following describes a communications apparatus in the embodiments of this application.

Figure 6:
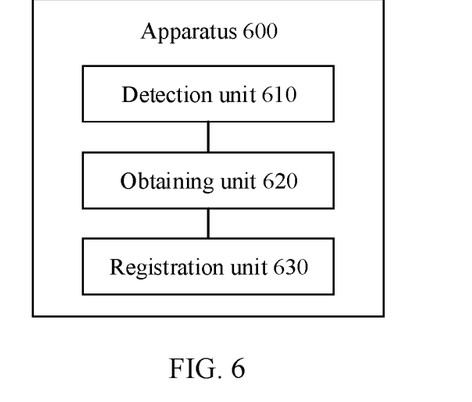
FIG. 6 is a schematic block diagram of a communications apparatus 600 according to an embodiment of this application.

FIG. 6 is a schematic block diagram of a communications apparatus 600 according to an embodiment of this application. As shown in FIG. 6, the communications apparatus 600 includes a detection unit 610, an obtaining unit 620, and a registration unit 630.

The detection unit 610 is configured to detect whether a first subscriber identification module SIM card of a terminal device falls back from a first-standard network to a second-standard network.

The obtaining unit 620 is configured to obtain a registration status of a second SIM card when the detection unit detects that the first SIM card falls back from the first-standard network to the second-standard network. The registration status of the second SIM card includes an operator of the second SIM card and a network on which the second SIM card camps. The first SIM card and the second SIM card enable the terminal device to work in dual SIM dual standby single pass mode.

The obtaining unit 620 is further configured to obtain a target standard network based on the registration status of the second SIM card.

The registration unit 630 is configured to register the first SIM card with the target standard network.

The units in the communications apparatus 600 in this embodiment of this application and the foregoing other operations or functions are separately used to implement corresponding procedures or operations in the communication method provided in this application.

In a possible design, some or all of the functions of the communications apparatus 600 may be implemented by software. For example, the communications apparatus 600 includes a memory and a processor. The memory is configured to store a program, and the processor is configured to execute the program stored in the memory. When the program is executed, the communications apparatus 600 may implement a method for returning from a low-standard network to a high-standard network in the embodiments of this application. The memory and the processor may be physically independent units, or the memory and the processor may be integrated together.

In a possible design, some or all of the foregoing functions of the communications apparatus 600 may be implemented by hardware, or a combination of hardware and software.

Optionally, the communications apparatus 600 may be a chip or an integrated circuit. For example, the communications apparatus 600 may be an SoC chip in a terminal device.

According to the communications apparatus provided in this application, when a primary card performing a data service on the terminal device falls back from a high-standard network to a low-standard network, a secondary card searches for the high-standard network by using a downlink radio frequency resource and by using a background search mechanism, to assist the primary card in returning to the high-standard network. This resolves a problem in the prior art that the primary card performing a data service cannot return to the high-standard network after falling back from the high-standard network to the low-standard network.

In addition, an embodiment of this application further provides a terminal device. The terminal device may perform the method for returning from a low-standard network to a high-standard network in the embodiments of this application. A structure of the terminal device may be shown in FIG. 7.

Figure 7:
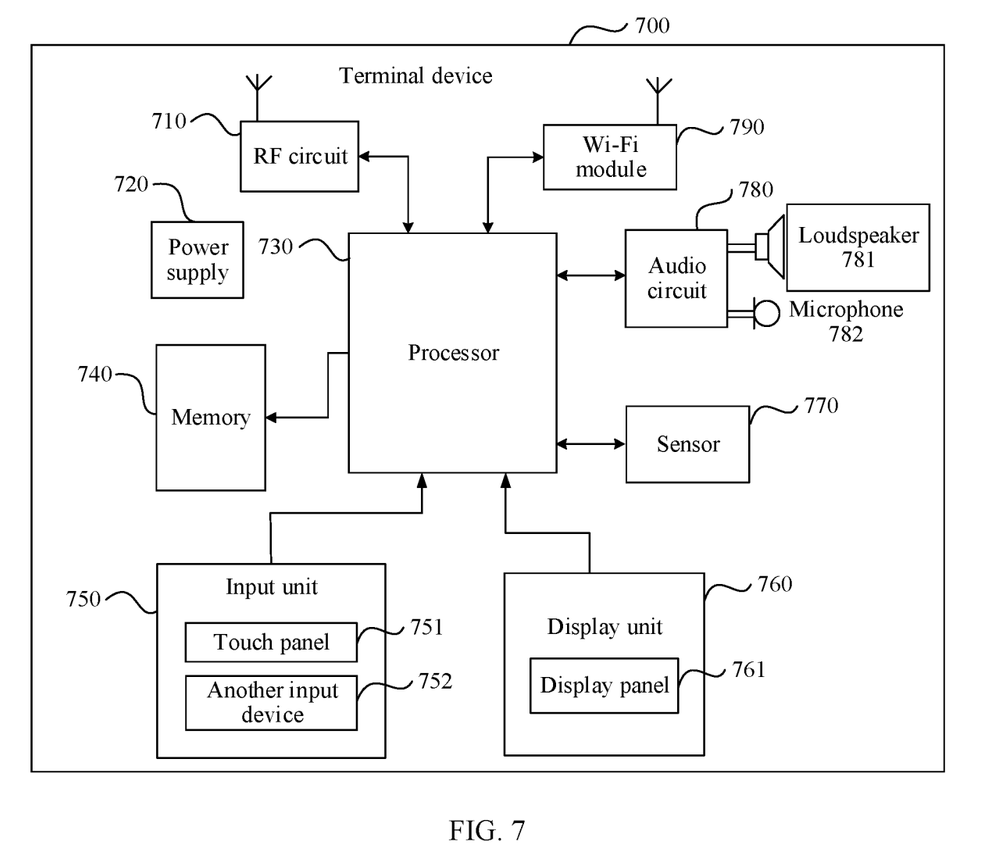
FIG. 7 is a schematic structural diagram of a terminal device 700 according to this application.

FIG. 7 is a schematic structural diagram of a terminal device 700 according to this application. A person skilled in the art may understand that a structure shown in FIG. 7 constitutes no limitation on the terminal device, and the terminal device may include more or less components than those shown in FIG. 7, or combine some components, or have different component deployments, or the like.

A radio frequency (RF) circuit 710 may be configured to receive and send information or receive and send a signal in a call process. Usually, the RF circuit 710 may include but is not limited to an antenna, at least one amplifier, a transceiver, a coupler, a low noise amplifier (LNA), a duplexer, and the like. The antenna may include antennas on all mobile phones, for example, a primary antenna and a secondary antenna. The secondary antenna may be a global positioning system (GPS) antenna, a Wi-Fi antenna, an NFC antenna, or the like. A plurality of secondary antennas may share one antenna body. In addition, the RF circuit 710 may further communicate with a network and another device by using a wireless communications technology. For example, the RF circuit 710 may receive downlink information sent by a base station, and may further transmit the received downlink information to a processor 730 for processing, or may send uplink data to the base station. The wireless communication technology may use any communications standard or protocol, including but not limited to a global system for mobile communications (GSM), a general packet radio service (GPRS), code division multiple access (CDMA), wideband code division multiple access (WCDMA), long term evolution (LTE), an email, a short messaging service (SMS), and the like.

The processor 730 may be a control center of the terminal device 700, is connected to each part of the terminal device by using various interfaces and lines, and performs various functions of the terminal device 700 by running or executing a software program and/or a module that are/is stored in a memory 740 and invoking data stored in the memory 740.

Optionally, the processor 730 may include an integrated circuit (IC). For example, the processor 730 may be formed by a separately packaged IC, or may be formed by connecting a plurality of packaged ICs that have a same function or different functions. The processor 730 may be a central processing unit (CPU), or may be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor. Alternatively, the processor may be any conventional processor. This is not limited in the embodiments of this application.

The memory 740 may mainly include a program storage area and a data storage area. The program storage area may store an operating system, an application program required by at least one function (for example, a voice playing function, or an image playing function), and the like. The data storage area may store data (for example, audio data, image data, and a phone book) created based on use of the terminal device 700, and the like. In addition, the memory 740 may include a high-speed random access memory, and may further include a nonvolatile memory, for example, at least one magnetic disk storage device, a flash memory device, or another volatile solid-state storage device.

In addition, the terminal device may further include an input unit 750, a display unit 760, one or more sensors 770, an audio circuit 780, and the like.

The input unit 750 may be configured to receive input digit or character information, and generate key signal input related to user setting and function control of the terminal device 700. Specifically, the input unit 750 may include a touchscreen 751 and another input device 752. The display unit 660 may be configured to display information entered by a user, information provided for the user, and various menus of the terminal device 700. The display unit 760 may include a display panel 761. Optionally, the display panel 751 may be configured in a form of a liquid crystal display (LCD), an organic light-emitting diode (OLED), or the like. Further, the touchscreen 751 may cover the display panel 761. In FIG. 7, the touchscreen 751 and the display panel 761 serve as two independent components to implement input and output functions of the terminal device 700. However, in some embodiments, the touchscreen 751 and the display panel 761 may be integrated to implement the input and output functions of the terminal device 700. The at least one sensor 770 may include a motion sensor. The motion sensor may be configured to obtain motion data of the terminal device, and determine a motion status of the terminal device and the like based on the motion data. Optionally, the at least one sensor 670 may further include another sensor, for example, an optical sensor or a gravity sensor. Specifically, the optical sensor may include an ambient optical sensor and an optical proximity sensor.

An audio circuit 780, a loudspeaker 781, and a microphone 782 may provide an audio interface between the user and the terminal device 700. The audio circuit 780 may be configured to convert received audio data into an electrical signal, and transmit the electrical signal to the loudspeaker 781. The loudspeaker 781 may be configured to convert the received electrical signal into a sound signal, and then output the sound signal. On the other hand, the microphone 782 may be configured to convert the collected sound signal into an electrical signal, and transmit the electrical signal to the audio circuit. The audio circuit 780 may convert the received electrical signal into audio data, and then output the audio data to the RF circuit 710 for sending the audio data to another device, or output the audio data to the memory 740 for further processing.

Optionally, the terminal device 700 may further include a power supply 720 (for example, a battery) configured to supply power to each component. Optionally, the power supply may be logically connected to the processor 730 by using a power management system, to implement functions such as charging management, discharging management, and power consumption management by using the power management system.

It should be understood that, although not shown, the terminal device 700 may further include a wireless fidelity (WiFi) module, a Bluetooth module, and the like. Details are not described herein.

It should be further understood that, for ease of description, FIG. 7 shows only a part related to the embodiments of this application. For specific technical details that are not disclosed, refer to specific descriptions in the embodiments of this application.

The method for returning from a low-standard network to a high-standard network in the embodiments of this application may be performed by the processor 730 in the terminal device.

In addition, this application further provides a computer-readable storage medium. The computer-readable storage medium stores an instruction. When the instruction runs on a computer, the computer is enabled to perform the method for returning from the low-standard network to the high-standard network in the embodiments of this application.

It should be understood that, for brevity, descriptions of the embodiments in this specification focus on differences between the embodiments. Therefore, unless explicitly is stated in the specification, or it can be seen from the context, mutual reference may be made between the embodiments of this specification.

A person of ordinary skill in the art may be aware that the method steps and units described with reference to the embodiments disclosed herein may be implemented as electronic hardware, or computer software, or a combination thereof. To clearly illustrate interchangeability between hardware and software, steps and compositions of each embodiment have been described above generally according to functions. Whether the functions are performed by the hardware or the software depends on a particular application and a design constraint condition of a technical solution. The person of ordinary skill in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and units, refer to a corresponding process in the method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or may be integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for switching between different generations of mobile networks, the method comprising:
   detecting, by a terminal device, that a first subscriber identification module (SIM) card of the terminal device switches from a newer generation mobile network to an older generation mobile network;
   obtaining, by the terminal device a registration status of a second SIM card, wherein the registration status indicates: (1) a wireless operator of the second SIM card, (2) whether the second SIM card is installed on the terminal device, and (3) a network standard used by the second SIM card, and wherein the first SIM card and the second SIM card enable the terminal device to work in dual SIM dual standby single pass mode;
   identifying, by the terminal device and based on the registration status, a target mobile network by performing a background search of a standard cell other than a serving cell of the terminal device by using a downlink radio frequency resource; and
   registering, by the terminal device, the first SIM card with the target mobile network.

2. The method according to claim 1, wherein a modem that serves the first SIM card is in a data service connectivity mode.

3. The method according to claim 1, wherein the target mobile network is identified as the newer generation mobile network when the wireless operator of the second SIM card is the same as an operator of the first SIM card, and the second SIM card uses the newer generation mobile network.

4. The method according to claim 1, wherein the obtaining the target mobile network comprises:
   when the wireless operator of the second SIM card is different from an operator of the first SIM card, or the second SIM card uses an older generation mobile network, instructing the second SIM card to search for the target mobile network; and
   identifying, by the second SIM card of the terminal device, the target mobile network based on a search result obtained by a modem corresponding to the second SIM card, wherein the search result is obtained by the modem by performing the search based on a downlink radio frequency resource.

5. The method according to claim 1, wherein identifying the target mobile network comprises:
   determining, by the terminal device and based on the registration status, that the second SIM card is not installed on the terminal device;
   instructing a modem comprised in a baseband processor of the terminal device corresponding to the second SIM card to perform the background search for the target mobile network using the downlink radio frequency resource; and
   obtaining, by the terminal device, the target mobile network from the modem.

6. The method according to claim 1, wherein the newer generation mobile network comprises one or more of a 4G, a 4.5G, and a 5G mobile network, and the older generation mobile network comprises one or more of a 2G or 3G mobile network.

7. A communications apparatus, comprising:
   at least one processor;
   a memory coupled to the at least one processor and storing programming instructions for execution by the at least one processor, the programming instructions instruct the at least one processor to:
   identify that a first subscriber identification module (SIM) card of the communications apparatus switches from a newer generation mobile network to an older generation mobile network;
   obtain a registration status of a second SIM card, wherein the registration status indicates: (1) a wireless operator of the second SIM card, (2) whether the second SIM card is installed on a terminal device, and (3) a network standard used by the second SIM card, and wherein the first SIM card and the second SIM card enable the terminal device to work in dual SIM dual standby single pass mode;
   identify, based on the registration status, a target mobile network by performing a background search of a standard cell other than a serving cell of the terminal device by using a downlink radio frequency resource; and
   register the first SIM card with the target mobile network.

8. The communications apparatus according to claim 7, wherein a modem that serves the first SIM card is in a data service connectivity mode.

9. The communications apparatus according to claim 7, wherein the target mobile network is identified as the newer generation mobile network when the wireless operator of the second SIM card is the same as an operator of the first SIM card, and the second SIM card uses the newer generation mobile network.

10. The communications apparatus according to claim 7, wherein obtaining the target mobile network comprises:
    when the wireless operator of the second SIM card is different from an operator of the first SIM card, or the second SIM card uses an older generation mobile network, instructing the second SIM card to search for the target mobile network; and
    identifying, by the second SIM card of the communications apparatus, the target mobile network based on a search result obtained by a modem corresponding to the second SIM card, wherein the search result is obtained by the modem by performing the search based on a downlink radio frequency resource.

11. The communications apparatus according to claim 7, wherein identifying the target mobile network comprises:
    determining, by the terminal device and based on the registration status, that the second SIM card is not installed on the terminal device;
    instructing a modem comprised in a baseband processor of the terminal device corresponding to the second SIM card to perform the background search for the target mobile network using the downlink radio frequency resource; and
    obtaining, by the terminal device, the target mobile network from the modem.

12. The communications apparatus according to claim 7, wherein the newer generation mobile network comprises one or more of a 4G, a 4.5G, and a 5G mobile network, and the older generation mobile network comprises one or more of a 2G or 3G mobile network.

13. A non-transitory, computer-readable medium storing one or more instructions executable by a computer system to perform operations comprising:
- detecting, by a terminal device, that a first subscriber identification module (SIM) card of the terminal device switches from a newer generation mobile network to an older generation mobile network;
- obtaining, by the terminal device a registration status of a second SIM card, wherein the registration status indicates: (1) a wireless operator of the second SIM card, (2) whether the second SIM card is installed on the terminal device, and (3) a network standard used by the second SIM card, and wherein the first SIM card and the second SIM card enable the terminal device to work in dual SIM dual standby single pass mode;
- identifying, by the terminal device and based on the registration status, a target mobile network by performing a background search of a standard cell other than a serving cell of the terminal device by using a downlink radio frequency resource; and
- registering, by the terminal device, the first SIM card with the target mobile network.

14. The non-transitory, computer-readable medium according to claim 13, wherein a modem that serves the first SIM card is in a data service connectivity mode.

15. The non-transitory, computer-readable medium according to claim 13, wherein the target mobile network is identified as the newer generation mobile network when the wireless operator of the second SIM card is the same as an operator of the first SIM card, and the second SIM card uses the newer generation mobile network.

16. The non-transitory, computer-readable medium according to claim 13, wherein the obtaining the target mobile network comprises:
- when the wireless operator of the second SIM card is different from an operator of the first SIM card, or the second SIM card uses an older generation mobile network, instructing the second SIM card to search for the target mobile network; and
- identifying, by the second SIM card of the terminal device, the target mobile network based on a search result obtained by a modem corresponding to the second SIM card, wherein the search result is obtained by the modem by performing the search based on a downlink radio frequency resource.

17. The non-transitory, computer-readable medium according to claim 13, wherein the identifying the target mobile network comprises:
- determining, by the terminal device and based on the registration status, that the second SIM card is not installed on the terminal device;
- instructing a modem comprised in a baseband processor of the terminal device corresponding to the second SIM card to perform the background search for the target mobile network using the downlink radio frequency resource; and
- obtaining, by the terminal device, the target mobile network from the modem.

18. The non-transitory, computer-readable medium according to claim 13, wherein the newer generation mobile network comprises one or more of a 4G, a 4.5G, and a 5G mobile network, and the older generation mobile network comprises one or more of a 2G or 3G mobile network.

* * * * *